United States Patent
Mohr

(10) Patent No.: US 7,882,440 B2
(45) Date of Patent: Feb. 1, 2011

(54) SYSTEM AND METHOD OF SWITCHING APPEARANCE OF A GRAPHICAL USER INTERFACE

(75) Inventor: Julia Mohr, Edingen-Neckarhausen (DE)

(73) Assignee: SAP AG, Walldorf (DE)

( * ) Notice: Subject to any disclaimer, the term of this patent is extended or adjusted under 35 U.S.C. 154(b) by 425 days.

(21) Appl. No.: 11/262,547

(22) Filed: Oct. 28, 2005

(65) Prior Publication Data

US 2007/0101285 A1  May 3, 2007

(51) Int. Cl.
*G06F 3/00* (2006.01)

(52) U.S. Cl. .................. 715/746; 715/744; 715/745; 715/747; 715/765; 715/778; 725/44; 725/45; 725/46; 725/47

(58) Field of Classification Search .............. 715/765, 715/744–747, 778; 725/44–47
See application file for complete search history.

(56) References Cited

U.S. PATENT DOCUMENTS

| | | | | |
|---|---|---|---|---|
| 5,179,700 | A * | 1/1993 | Aihara et al. | 715/866 |
| 5,220,675 | A * | 6/1993 | Padawer et al. | 715/826 |
| 5,452,416 | A * | 9/1995 | Hilton et al. | 715/783 |
| 5,737,557 | A * | 4/1998 | Sullivan | 715/765 |
| 5,905,492 | A * | 5/1999 | Straub et al. | 715/744 |
| 6,061,695 | A * | 5/2000 | Slivka et al. | 715/203 |
| 6,092,050 | A | 7/2000 | Lungren et al. | |
| 6,188,399 | B1 * | 2/2001 | Voas et al. | 715/723 |
| 6,232,968 | B1 * | 5/2001 | Alimpich et al. | 715/744 |
| 6,249,293 | B1 * | 6/2001 | Yumoto et al. | 345/474 |
| 6,401,094 | B1 * | 6/2002 | Stemp et al. | 707/10 |
| 6,731,310 | B2 * | 5/2004 | Craycroft et al. | 715/765 |
| 6,850,693 | B2 * | 2/2005 | Young et al. | 386/83 |
| 6,886,135 | B2 * | 4/2005 | Fernandez et al. | 715/762 |
| 6,934,697 | B1 * | 8/2005 | Warren | 707/1 |
| 7,027,069 | B2 * | 4/2006 | Mima et al. | 345/594 |
| 7,197,715 | B1 * | 3/2007 | Valeria | 715/747 |
| 7,543,235 | B2 * | 6/2009 | Novak et al. | 715/744 |
| 7,546,547 | B2 * | 6/2009 | Carey et al. | 715/788 |
| 7,661,109 | B2 * | 2/2010 | Lindhorst et al. | 719/316 |
| 2002/0024539 | A1 * | 2/2002 | Eleftheriadis et al. | 345/765 |
| 2002/0070978 | A1 * | 6/2002 | Wishoff et al. | 345/811 |
| 2003/0025730 | A1 * | 2/2003 | Brennan | 345/760 |
| 2003/0112262 | A1 * | 6/2003 | Adatia et al. | 345/716 |
| 2004/0008360 | A1 * | 1/2004 | Ankrum et al. | 358/1.13 |
| 2004/0012628 | A1 * | 1/2004 | Kropf et al. | 345/744 |
| 2004/0158859 | A1 * | 8/2004 | Aoyama et al. | 725/45 |
| 2004/0164973 | A1 * | 8/2004 | Nakano et al. | 345/184 |
| 2004/0179034 | A1 * | 9/2004 | Burritt | 345/744 |
| 2004/0216054 | A1 * | 10/2004 | Mathews et al. | 715/765 |
| 2004/0243940 | A1 * | 12/2004 | Lee et al. | 715/744 |
| 2005/0132036 | A1 * | 6/2005 | Jang et al. | 709/223 |
| 2005/0210398 | A1 * | 9/2005 | Novak et al. | 715/765 |
| 2005/0246646 | A1 * | 11/2005 | Beam et al. | 715/747 |
| 2008/0178082 | A1 * | 7/2008 | Foxenland | 715/702 |
| 2008/0293495 | A1 * | 11/2008 | Okada | 463/42 |

* cited by examiner

*Primary Examiner*—Weilun Lo
*Assistant Examiner*—Eric Wiener
(74) *Attorney, Agent, or Firm*—Kenyon & Kenyon LLP

(57) ABSTRACT

A styleswitcher displayed in a graphical user interface allowing a user to transform the appearance of the graphical user interface with one-click access. The styleswitcher captures viewing settings previously selected and saved by the user. By clicking on an available styleswitcher, the user causes the entire graphical user interface to refresh and display in viewing settings corresponding to the selected styleswitcher.

42 Claims, 4 Drawing Sheets

300

400

SYSTEM AND METHOD OF SWITCHING APPEARANCE OF A GRAPHICAL USER INTERFACE

BACKGROUND

The present invention generally relates to the presentation of images and text in a graphical user interface (GUI) and more specifically to the instant display of a GUI in a style selected by the user.

Current software applications offer consumers many opportunities to improve the quality of user experience by allowing them to customize different aspects of computer programs. Particularly, users are able to personalize the appearance of a GUI by choosing various display preferences. For example, a user of an email application can choose to view detailed information of each email message, such as sender, time, subject, attachment, priority information, or the same user can choose to see only the sender of each email message. Analogously, a user of an online search program can choose to view a GUI in the German language, or the same user can choose to read information in Japanese. Some software programs allow consumers to see GUIs in particular colors by selecting color schemes. These user-friendly options provide consumers an excellent opportunity to personalize their interaction with the software program and to ensure that the users' visual experience meets their business and personal needs.

While existing software programs attempt to provide a high level of versatility and convenience in the user experience, they still confront some troubling obstacles in achieving complete customer satisfaction.

First of all, existing software applications do not allow a user to compile a list of preferred display styles. That is, a user cannot refer to an inventory of display styles that he/she might want to use at another time. Therefore, if a user has one set of display preferences for one GUI of a software application and a second set of different display preferences for a second GUI in the same application, the user must re-select each set of display criteria every time he/she views each GUI. Existing technology requires unnecessary time spent during each criteria selection; it also forces the user to memorize different sets of viewing preferences for different GUIs. As the number of GUIs increases with numerous software programs that a user encounters everyday, this can be a daunting task.

Secondly, existing software programs do not allow a user to easily switch between different display styles. In the above example, every time the user wants to switch to a different display style in a GUI, he/she must encounter the tedious process of a personalization dialogue, which often requires the user to go through multiple input and command windows before the user is able to see the GUI as desired. Repeating this process is time consuming and troublesome for the high-speed computing world of today.

The present invention overcomes the disadvantages of existing systems by allowing users to view a GUI in different display styles with one-click access, within the same level of the GUI. More specifically, in an exemplary embodiment, the present invention integrates an iView section in a navigation panel. The iView section offers a user a list of display styles, called "styleswitchers." Each styleswitcher enables the user to see a GUI in a combination of viewing preferences previously selected and saved by the user. That is, the user easily transforms the appearance of an entire GUI to a different display style by clicking on an available styleswitcher in the iView section.

DETAILED DESCRIPTION

To facilitate an understanding of the terms used herein, the following definitions are provided.

The term "viewing criteria" is intended to include display preferences available to a user for customization, such as color, contrast, language, detailed information or simple view, etc.

The term "display style" is intended to include the combination of viewing criteria selected by a user and designated as a distinct style by the user.

The term "styleswitcher" is intended to include an arrangement for switching to a display style.

The term "iView section" is intended to include an area in the navigation panel offering a list of available styleswitchers.

Embodiments of the present invention provide styleswitchers for uses in visually versatile software applications, such as SAP's ERP Human Capital Management module, CRM Improving Order Management application, and mySAP Supplier Relationship Management program. According to these embodiments, a graphical user interface (GUI) of a software application integrates an iView section in its navigation panel, typically located on the left side of the computer screen. The iView section offers a user a compilation of display styles that the user may apply to change the appearance of the entire GUI. These styleswitchers are saved by the user from his/her previous usage or selection. Each styleswitcher encompasses a different set of viewing criteria chosen by the user. When the user clicks on an available styleswitcher in the iView section, the entire GUI is refreshed and transformed into a different appearance according to the viewing criteria corresponding to the selected styleswitcher.

Figure 1:
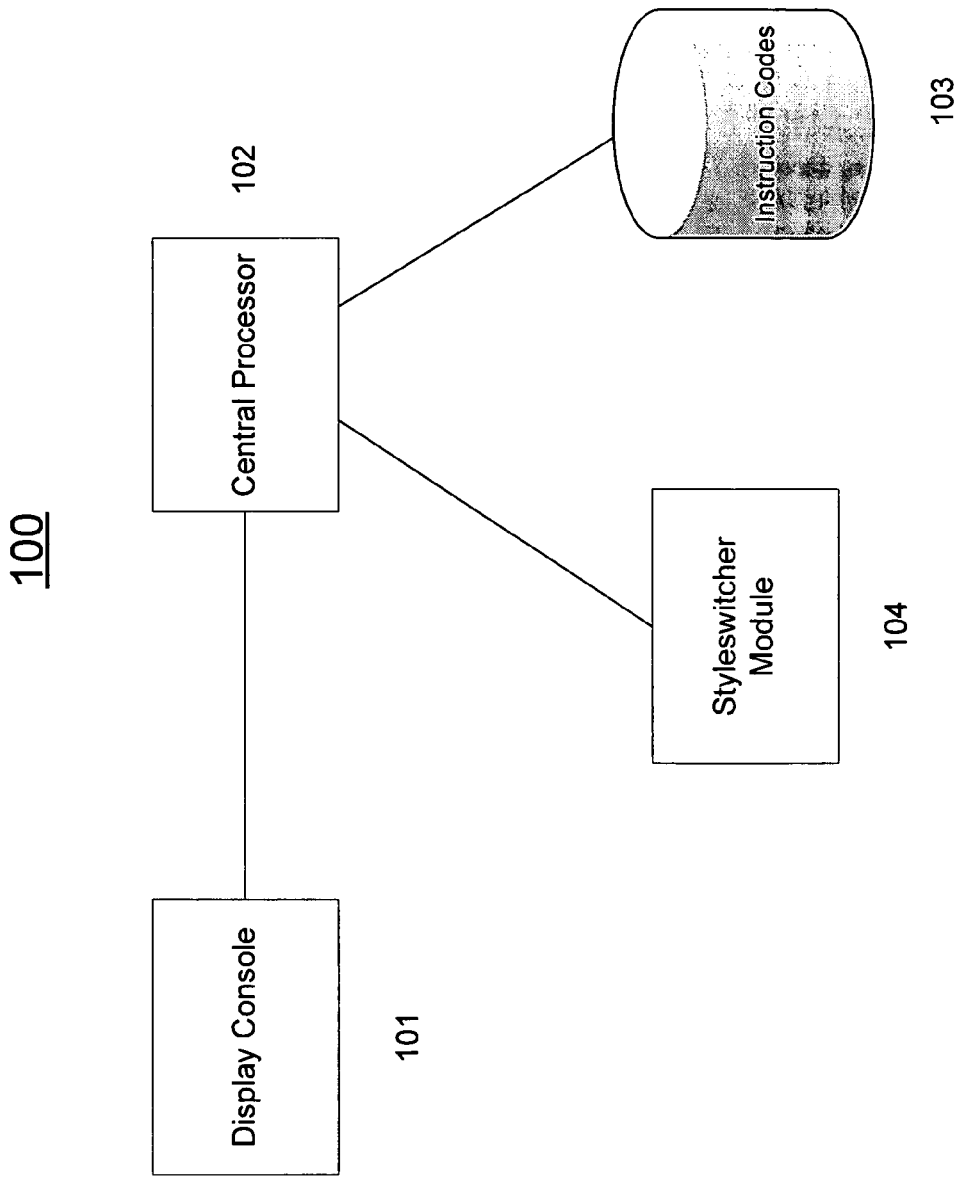
FIG. 1 is a block diagram of a computer system containing a styleswitcher module, a set of instruction codes, a central processor, and a display console.

FIG. 1 is a block diagram of one embodiment of the present invention. It shows a computer system 100 containing display console 101, central processor 102, a set of instruction codes 103, and styleswitcher module 104. Styleswitcher module 104 provides storage for viewing criteria for a list of display styles saved by the user and is stored on non-transitory computer readable media. Styleswitcher module 104 can also store viewing criteria for a GUI's default view. A set of instruction codes 103 stored on non-transitory computer readable media interprets commands from user input, such as display GUI in a selected styleswitcher, hide a styleswitcher, show a styleswitcher, or save selected viewing criteria as a styleswitcher. Central processor 102 receives user command input and communicates the command to set of instruction codes 103 and styleswitcher module 104. According to the user command, central processor 102 receives instructions from set of instruction codes 103 and intercepts viewing criteria from styleswitcher module 104. Central processor 102 communicates the instructions and viewing criteria to display console 101. Display console 101 executes the instructions received and shows GUI in a display style according to the viewing criteria received.

In an alternative embodiment, display console 101 is implemented as a computer screen provided to a user for viewing. The computer screen offers a list of one-click styleswitchers from which the user may choose. When the user makes a selection by clicking an available styleswitcher on the same computer screen, the computer screen is displayed according to the viewing criteria of the selected styleswitcher.

Figure 2:
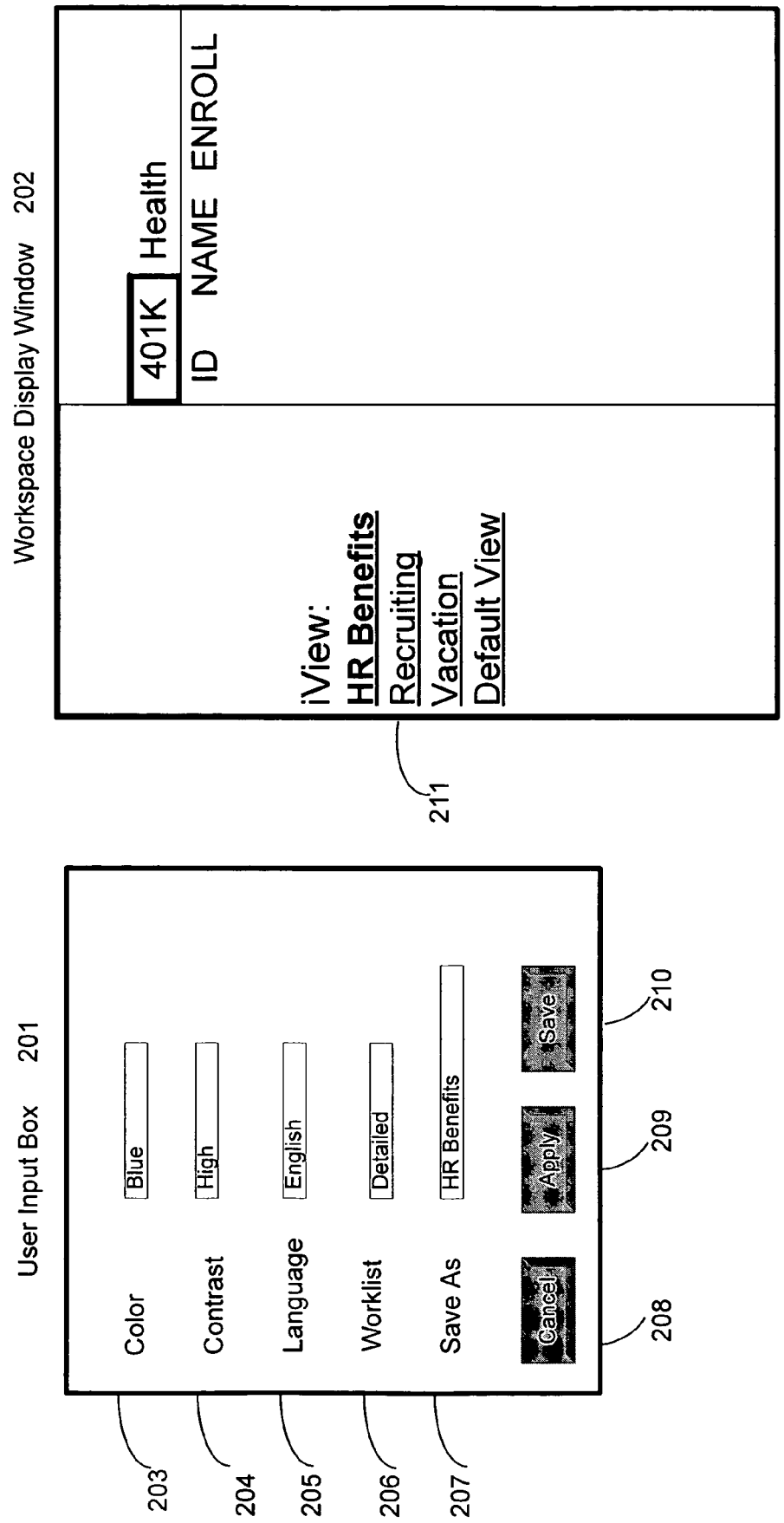
FIG. 2 is a block diagram illustrating one embodiment of a styleswitcher using a user input box for display preferences and a workspace display window showing the visual output of display preferences corresponding to a selected styleswitcher.

FIG. 2 is a block diagram illustrating one embodiment of a styleswitcher via a user input box 201, where the user selects viewing criteria, and a workspace display window 202, which shows the visual output of a selected display style according to its viewing criteria. User input box 201 contains viewing criteria applicable or enabled by a software program. In this instance, the criteria of color 203, contrast 204, language 205, and worklist information 206 are available. The user personalizes his/her visual experience by selecting available choices. For example, the user can select "Blue" for color 203, "High" for contrast 204, "English" for language 205, and "Detailed" for worklist information. The user proceeds to create a name for the above combination of viewing criteria in order to save the style. Insomuch as a styleswitcher is available in a role-based application, such as a human resources planning application, the user who frequently uses a human resources benefits module may prefer to repeatedly view the module in the above combination of viewing criteria. In this instance, the user creates "HR Benefits" as a styleswitcher name for the combination of viewing criteria and enters such in style name 207. User input box 201 allows the user to cancel action 208, apply current viewing criteria to active GUI 209, or save style 210, by clicking on one of the available action buttons. Workspace display window 202 shows the effect of the same user later clicking on styleswitcher "HR Benefits" in a human resources planning application GUI. That is, the active GUI appears in a blue color, with high contrast resolution, in the English language, and with detailed information about human resource benefits for relevant employees. GUI indicates that it is currently shown in "HR Benefits" style by highlighting, such as bolding or italicizing, the "HR Benefits" styleswitcher label. iView section 211 is constantly displayed in workspace display window 202.

In an alternative embodiment of the present invention, a user, who repeatedly views GUIs in the same style, can choose to hide the entire iView section from the navigation panel.

In one embodiment, a styleswitcher is implemented so as to capture a list of selected viewing criteria sequentially, enabling a user to transform the appearance of an entire GUI one individual viewing criteria at a time. That is, as applied to the above mentioned "HR Benefits" styleswitcher, when the user selects the "HR Benefits" styleswitcher, the GUI appears in a blue color. Subsequently, when the user selects the "HR Benefits" styleswitcher again, the GUI, while still shown in the blue color, appears in high contrast resolution. This process of adding viewing criteria individually to the GUI can be repeated until every viewing criteria is applied on the screen. Consequently, the user's selection of the "HR Benefits" styleswitcher, after the entire list of viewing criteria is displayed on the screen, causes the GUI to retreat back one individual viewing criteria at a time. That is, when the user selects the "HR Benefits" styleswitcher, after the GUI appears in the blue color, with high contrast resolution, in the English language, and with detailed information about human resources benefits for relevant employees, the GUI retreats back one individual viewing criteria at a time so that the GUI still appears in the blue color, with high contrast resolution, in the English language, but no longer in the detailed information view. Instead, the GUI appears in a default information view. A subsequent selection of the "HR Benefits" styleswitcher causes the GUI to still appear in the blue color, with high contrast resolution, but no longer in the English language. Rather, the GUI appears in a default language. This process of subtracting one individual viewing criteria at a time from the GUI can be repeated until the entire list of viewing criteria disappears from the GUI.

In another embodiment, the iView section only displays styleswitchers that are not currently in use. In other words, while a GUI appears in a particular style, the corresponding styleswitcher is not available in the iView section, indicating to the user that the GUI is shown in the particular style hidden from the user.

In an alternative embodiment, the iView section is implemented as a menu choice at the top of the computer screen.

Figure 3:
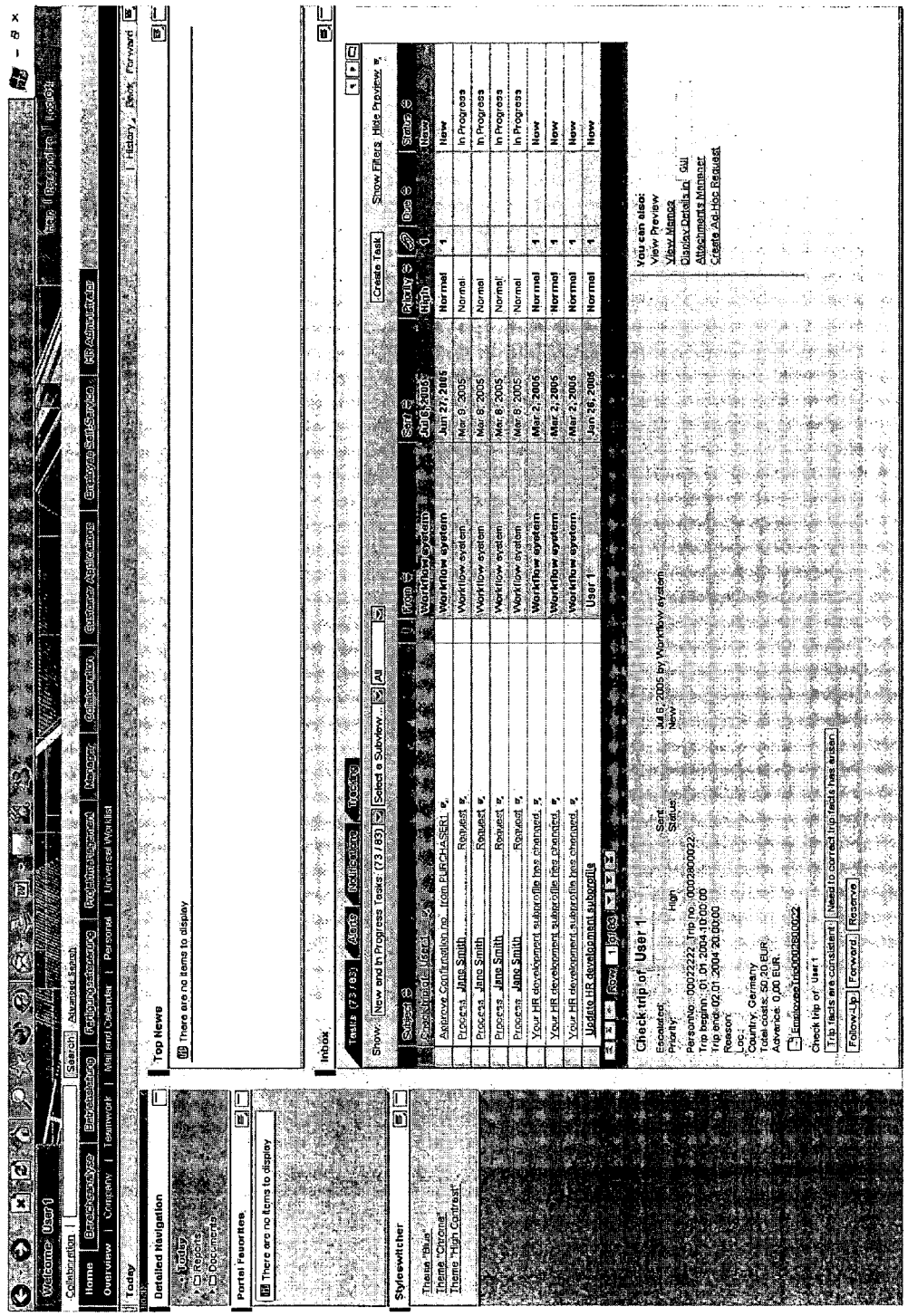
FIG. 3 is a screen shot illustrating an exemplary iView section offering a list of styleswitchers in a left-side navigation panel.

FIG. 3 is a screen shot of one embodiment of the present invention. In a graphical user interface 300, a list of styleswitchers 301 is available to the user as links in a left-side navigation panel. A list of styleswitchers 301 are represented as "themes," including, for example, "Theme Blue," "Theme Chrome," and "Theme High Contrast." When the user clicks one styleswitcher link, the entire GUI appears according to the viewing criteria of the selected styleswitcher.

In an alternative embodiment, each styleswitcher is implemented as an option in an iView drop down box. When the user clicks on the iView drop down box, a list of available styleswitchers appears, allowing the user to select a styleswitcher desired.

Figure 4:
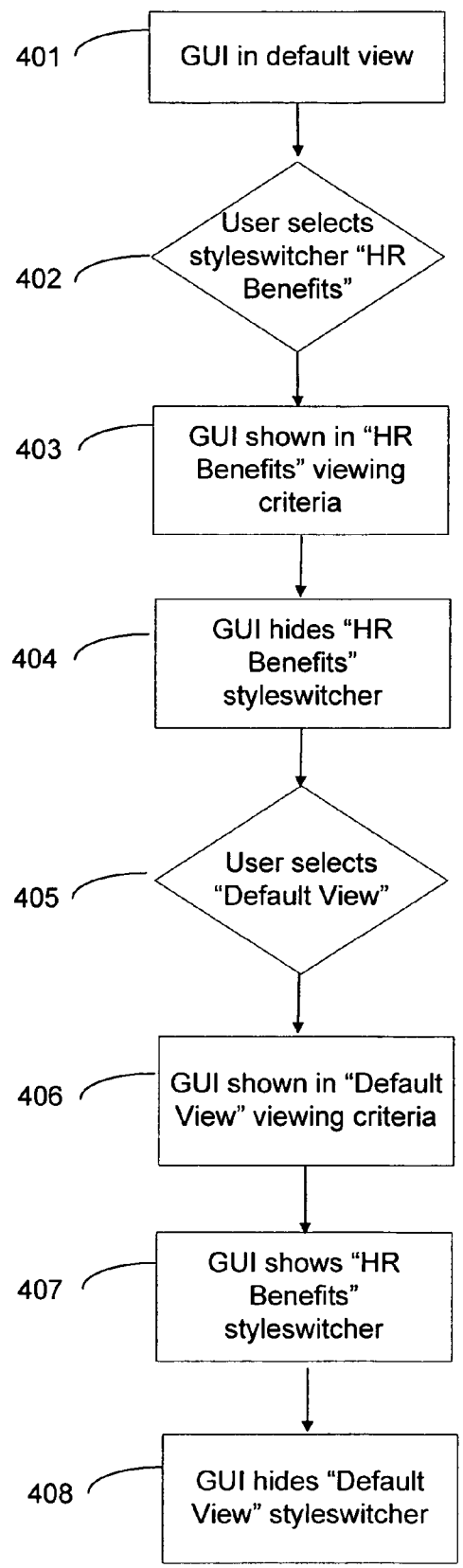
FIG. 4 is a flow chart of the steps of one embodiment of a styleswitcher.

FIG. 4 is a flow chart of the steps in one exemplary embodiment of the present invention. A graphical user interface (GUI) 400 is displayed in its default view in step 401. Subsequently, the user selects styleswitcher "HR Benefits" in step 402. In step 403, the GUI is shown in viewing criteria according to "HR Benefits" style. In step 404, "HR Benefits" styleswitcher is hidden from the user. In step 405, the user switches the GUI back to its default view by clicking on "Default View" styleswitcher. In step 406, the GUI is displayed in its default view. In step 407, the GUI makes "HR Benefits" styleswitcher available to the user by making it visible to the user. Lastly, in step 408, the GUI hides "Default view" styleswitcher to indicate that the GUI is currently shown in its default display.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer system comprising:
a display device, and
a processor executing program instructions representing a graphical user interface to be displayed via the display device,
the graphical user interface having a display area to display content of a software application executed by the processor according to a currently-activated display style;
the graphical user interface further including one control element that, a first time the control element is selected by a user, causes the graphical user interface to capture a list of viewing criteria, and display in a display style, the display style showing an effect of a first viewing criteria of the list,
wherein each subsequent selection of the control element adds only one viewing criterion that is sequentially selected from the list of viewing criteria to the existing display style to show an effect of the sequentially selected one viewing criterion on the displayed content.

2. The computer system of claim 1, wherein the section offers a list of control elements that, when displayed, show names of a plurality of display styles saved by the user.

3. The computer system of claim 2, wherein each display style is a particular combination of viewing criteria selected by the user.

4. The computer system of claim 1, wherein the control element is a link.

5. The computer system of claim 1, wherein the control element is an option in a drop down menu.

6. The computer system of claim 1, wherein the graphical user interface includes a default view.

7. The computer system of claim 1, wherein the section is constantly visible.

8. The computer system of claim 1, wherein the section is hidden from the user based on choice.

9. The computer system of claim 1, wherein the GUI highlights the control element whose style is currently displayed in the graphical user interface.

10. The computer system of claim 1, wherein the GUI hides the control element whose style is currently displayed in the graphical user interface.

11. A method of switching appearance of a graphical user interface for a software application, comprising:
displaying a section in the graphical user interface;
displaying a control element in the section for selection by a user; and
when the control element is first selected by the user,
capturing a list of viewing criteria, and
displaying the graphical user interface in a display style, the display style showing an effect of a first criteria of the list, and
when the control element is subsequently selected by the user, adding only one viewing criterion that is sequentially selected from the list of viewing criteria to the existing display style to show an effect of the sequentially selected one viewing criterion on the displayed content.

12. The method of claim 11, further comprising constantly displaying the section.

13. The method of claim 11, further comprising hiding the section at the user's choice.

14. The method of claim 11, further comprising highlighting the control element whose style is currently displayed in the graphical user interface.

15. The method of claim 11, further comprising hiding the control element whose style is currently displayed in the graphical user interface.

16. A non-transitory computer readable medium having program instructions stored thereon that, when executed, perform the steps of: displaying a section including a control element in a graphical user interface for a software application; and when the control element is first selected by a user, capturing a list of viewing criteria, and displaying the graphical user interface in a display style, the display style showing an effect of a first criteria of the list, and when the control element is subsequently selected by the user, adding only one viewing criterion that is sequentially selected from the list of viewing criteria to the existing display style to show an effect of the sequentially selected one viewing criterion on the displayed content.

17. The medium of claim 16, wherein the section offers a list of control elements that, when displayed, show names of a plurality of display styles saved by the user.

18. The medium of claim 17, wherein each display style is a particular combination of view criteria selected by the user.

19. The medium of claim 16, wherein the control element is a link.

20. The medium of claim 16, wherein the control element is an option in a drop down menu.

21. The medium of claim 16, wherein the graphical user interface includes a default view.

22. The medium of claim 16, wherein the section is constantly visible.

23. The medium of claim 16, wherein the section is hidden from the user based on choice.

24. The medium of claim 16, wherein the section highlights the control element whose style is currently displayed in the graphical user interface.

25. The medium of claim 16, wherein the section hides the control element whose style is currently displayed in the graphical user interface.

26. A computer system having at least one screen for viewing a graphical user interface of a software application by a user, the computer system comprising: a device for offering at least one one-click control element for selection by the user on a same screen that the user is currently viewing; a device for capturing a list of viewing criteria; a device for displaying the screen according to a display style when the control element is first selected, the displaying style showing an effect of a first criteria of the list, and wherein each subsequent selection of the control element add only one viewing criterion that is sequentially selected from the list of viewing criteria to the existing display style to show an effect of the sequentially selected one viewing criterion on the display content.

27. The computer system of claim 26, further comprising a device for offering a list of control elements that, when displayed, show names of a plurality of display styles saved by the user.

28. The computer system of claim 27, wherein each display style is a particular combination of viewing criteria selected by the user.

29. The computer system of claim 26, further comprising a device for offering the control element as a link.

30. The computer system of claim 26, further comprising a device for offering the control element as an option in a drop down menu.

31. The computer system of claim 26, further comprising a device for including a default view for the screen.

32. The computer system of claim 26, wherein the control element is constantly visible.

33. The computer system of claim 26, further comprising a device for hiding the control element at the user's choice.

34. The computer system of claim 26, further comprising a device for highlighting the control element whose style is currently displayed on the screen.

35. The computer system of claim 26, further comprising a device for hiding the control element whose style is currently displayed on the screen.

36. The computer system of claim 26, further comprising a device for displaying a section on the screen, wherein the section offers at least one one-click control element for selection by the user on a same screen that the user is currently viewing.

37. The computer system of claim 1, wherein the software application is a human resource planning application.

38. The computer system of claim 1, wherein one of the viewing criteria is language.

39. The computer system of claim 1, wherein a subsequent selection of the control element selects only another single viewing criterion next in the list of viewing criteria and add the another criterion to the display style.

40. The computer system of claim 1, wherein after the selection of the control element reaches the last viewing criterion in the list of viewing criteria, each further selection of the control element advances the graphical user interface to a new display style that changes a single viewing criterion in an order reverse to the list of viewing criteria starting from the last viewing criterion in the list of viewing criteria.

41. The computer system of claim 40, wherein each further selection subtract the single viewing criterion according to the reverse order from the display style to show an effect without the subtracted single viewing criterion on the display content.

42. The computer system of claim 1, wherein the viewer-specified plurality of viewing criteria are saved in a storage, the plurality of viewing criteria being retrievable via a user-defined name.

* * * * *